Figure 4:
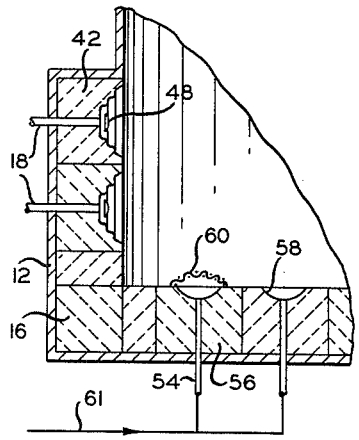

June 22, 1965 R. R. GOINS 3,190,627
PROCESS AND APPARATUS FOR DRYING SOLIDS
Filed Jan. 7, 1963

INVENTOR.
R. R. GOINS
BY *Young & Quigg*
ATTORNEYS 3,190,627
PROCESS AND APPARATUS FOR DRYING SOLIDS
Robert R. Goins, Bartlesville, Okla., assignor to Phillips
Petroleum Company, a corporation of Delaware
Filed Jan. 7, 1963, Ser. No. 249,682
13 Claims. (Cl. 263—21)

This invention relates to a process and apparatus for drying particulate solids such as carbon black pellets formed in a wet pelleting process.

Fluidized bed drying is being applied to the drying of various particulate solids. This technique involves maintaining a fluidized bed of the solids with a drying gas heated exteriorly to the drying zone, such as in a burner or furnace. In this type of process, because of equipment limitations, the maximum inlet gas temperature used to the present time has been about 1400° F. with an outlet gas temperature of about 300° F. Higher temperatures require expensive metal or ceramic construction. This amounts to a temperature difference of about 1100° F. which is an indication of the heating efficiency of the process. With higher inlet temperatures the efficiency could be increased accordingly.

In the drying of some solids, such as carbon black pellets, the solids suffer attrition which increases with the time of residence in the fluidized bed. By cutting down on the drying time, attrition and resulting fines formed in the process can be reduced.

This invention is concerned with an improved apparatus and process for drying solids within reduced drying times and with less development of fines when the drying solids are subject to attrition.

Accordingly it is an object of the invention to provide an improved process and apparatus for drying particulate solid materials. Another object is to provide a drying process and dryer for drying particulate solids which dries at a faster rate than conventional drying processes and dryers. A further object is to decrease the drying time required in the drying of particulate solids. It is also an object of the invention to provide a process utilizing simple inexpensive equipment for drying small solids with high gas inlet temperatures. Additional objects of the invention include decreasing the amount of fines when drying particulate solids subject to attrition and increasing the capacity of a dryer of given size. Other objects of the invention will become apparent to one skilled in the art upon consideration of the accompanying disclosure.

The process of the invention comprises fluidizing the particulate solids to be dried with a fluidizing gas so as to maintain a fluidized bed of the solids in an enclosed drying zone, applying radiant heat directly to the fluidized bed from gas-fired radiant burners at a burner temperature in the range of about 1,000 to 3,200° F. so that the burner gases supply the major portion of the fluidizing gas and burner gases and radiant heat rapidly dry the solids. The fluidized gas is introduced to the lower section of the bed and off-gas is withdrawn from the upper section of the drying zone. Dried solids are withdrawn from any section of the bed desired and the wet solids are generally introduced to the bed at a point remote from the withdrawal point. When drying carbon black pellets it is usually desirable to maintain the oxygen concentration in the fluidizing-drying gas relatively low, such as not more than about one volume percent. In applications of the process in which insufficient fluidizing gas is provided by the burner gases, supplemental fluidizing gas is introduced either thru the burners themselves or thru injection means in the bottom of the drying chamber. Suitable supplemental fluidizing gas comprises inert gases or, preferably, the off-gas from the drier with partial removal of water if desired, a portion of this off gas being recycled and introduced, preferably, thru auxiliary inlet conduits in the bottom of the bed in such a manner as to prevent dead spots and improve fluidization.

The dryer utilizes radiant burners as the sole heat source within the drying chamber. These are positioned in the bottom of the drying chamber facing upwardly or in the lower section of the peripheral wall of the drying chamber adjacent the bottom thereof, facing inwardly.

Wet carbon black pellets are usually fed to the dryer at a temperature in the range of about 150 to 200° F. and are withdrawn at a temperature in the range of about 200 to 400° F. Withdrawal temperature may be controlled in this range by design of the furnace and by combustion temperature attained (by controlling ratio of air to fuel) as well as by the amount of auxiliary fluidizing gas used. Solids outlet temperatures above 400° F. may be obtained where desired, particularly in applications to materials other than carbon black.

Figure 3:
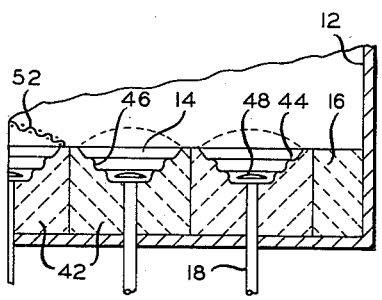
Figure 2:
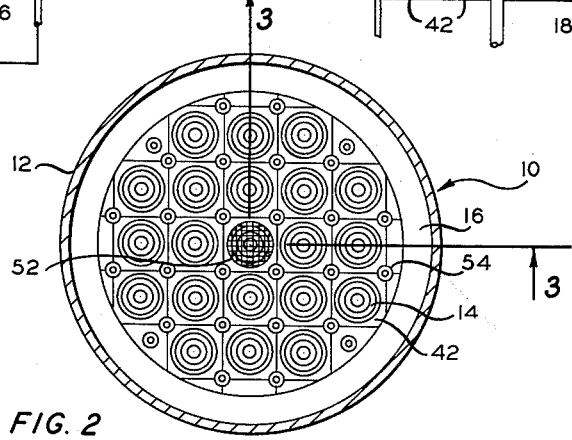
Figure 1:
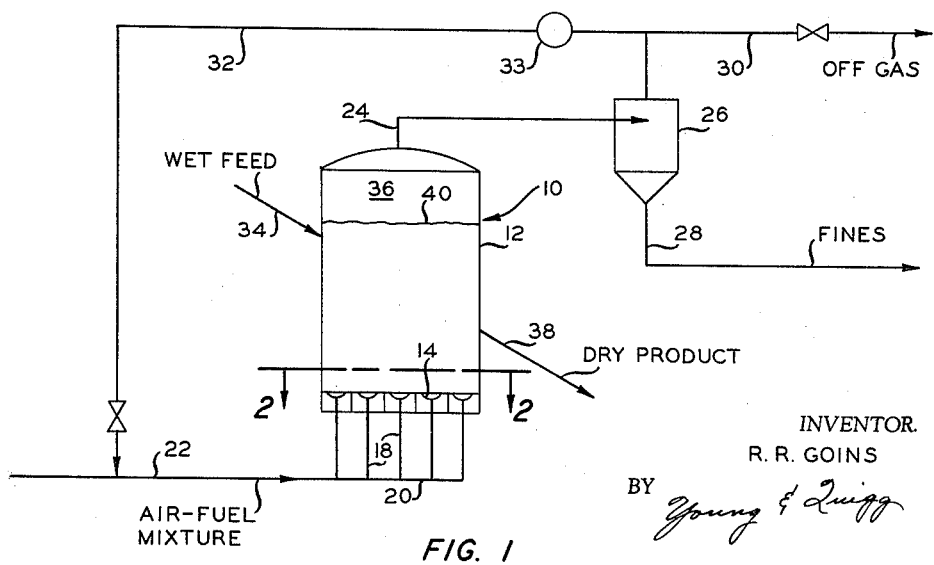

A more complete understanding of the invention may be obtained by reference to the accompanying schematic drawing of which FIGURE 1 is an elevation of one arrangement of the apparatus of the invention; FIGURE 2 is a cross section taken on the line 2—2 of FIGURE 1; FIGURE 3 is a fragmentary vertical section of the burner arrangement of FIGURES 1 and 2; and FIGURE 4 is a view similar to FIGURE 3 showing a burner and gas injection arrangement of a second embodiment of the invention.

Referring to FIGURES 1, 2, and 3, a dryer 10 comprises a steel shell 12 provided with a series of radiant burners 14 in its bottom section. Ceramic spacing ring 16 lines the shell adjacent the burners. Each burner is supplied by a gas line 18 connecting with a manifold 20 which in turn connects with an air-fuel supply line 22. An off-gas line 24 leads from the top of the shell to a cyclone separator 26 from which fines are recovered thru line 28 and off-gas is vented thru line 30. A recycle line 32 provided with blower 33 communicates with off-gas line 30 and with air-fuel line 22 or with a separate injection system for supplemental fluidizing gas described below. A conveyor line 34 serves to introduce the wet, solid, particulate material to drying chamber 36 and line 38 connects with the drying chamber and serves to remove dried material therefrom. These lines for supplying and removing material to and from the fluidized bed 40 may be positioned at other locations in the drier but preferably should be remote from each other.

FIGURES 2 and 3 show one arrangement of the radiant burners in the dryer. Burner blocks 42 are made of ceramic materials which withstand temperatures of more than 3,200° F., such as corundum, Alundum (both aluminum oxide), mullite, etc. A burner bowl 44 is positioned in the upper face of the burner block and may be provided with concentric ridges 46 for rendering the burner more effective in burning the fuel mixture on the burner bowl. A distribution head 48 is positioned near the base of the burner bowl adjacent the end of conduit 18 which serves to feed the fuel-air mixture to the burner.

In some applications it may be desirable to provide the burners with a screen 52, but usually the egress of gas from the burner bowl prevents accumulation of particulate material in the burner. As shown in FIGURE 2, supplemental gas injection conduits 54 are disposed in the bottom of the dryer extending thru burner blocks 42, but other locations may be utilized.

Burner blocks 42 are positioned in the upright wall of the drier in FIGURE 4. Gas injection conduits 18 connect with a suitable gas manifold (not shown) such as manifold 20 in FIGURE 1. Two rows of the burners are shown and these extend all around the periphery of the drying chamber adjacent the bottom thereof. Additional rows may be utilized in applications where they are needed. Also, it is feasible to utilize one row of burners in the upright wall of the drier and supplement the heating from these burners with additional burners in the floor of the dryer. Relatively thick ceramic insulation 56 is provided in the floor of the drying chamber illustrated in FIGURE 4 and supplemental gas injection conduits 54 extend thru the insulation, terminating in a concave recess or cup 58 in the floor of the chamber. A screen refractory 60, covering the gas distribution cup 58 may be provided to exclude solids from the injection conduits when the same are not in use. Conduits 54 connect with a suitable gas manifold 61.

Other arrangements of the burners than those shown in the drawing may also be utilized. To illustrate, radiant burners may be suspended in the bed with the burner bowl facing inwardly or downwardly and spaced well above the floor of the drying chamber. In such an arrangement supplemental fluidizing gas must be supplied thru the floor of the dryer. However, the arrangements shown in the drawings are preferred to suspending the burners in the drying chamber.

The invention is particularly adapted to the drying of carbon black pellets made in a wet pelleting process wherein the pellets contain from about 40 to about 60 percent of water by weight. However, the invention is also adapted to the drying and/or calcining of other particulate materials which are amenable to fluidizing in a gas. Other materials which may be dried and/or calcined in accordance with the invention include catalyst pellets, ore, sand, limestone, coal, etc.

Any type of radiant burner may be utilized in the apparatus and process described herein. The Selas burner is well adapted to use in radiant heat drying in a fluidized bed. The Schwank burner is also well adapted for this use. The invention is not dependent upon the particular design of the burner, the basic requirements being the radiant heat capacity of the burner and the directing of the radiant heat into the fluidized bed.

The temperatures of the combusted gas and of the radiating surface of the radiant burners approaches 3200° F. when operating on a stoichiometric fuel gas and air mixture. However, it has been found that the gas temperature a short distance removed from the burner surface is at bed temperature which is a great deal lower. This relatively low temperature close to the burner bowl is caused by the rapid mixing and effective heat transfer inherent in the fluidized bed process. By controlling the rate of introduction and withdrawal of wet and dried material, respectively, it is feasible to maintain bed temperatures as low as about 200 to 400° F. with extremely rapid heat transfer and vaporization of moisture. Thus, low concentrations of oxygen can be tolerated in the bed, but it is usually desirable to maintain the concentration below about one volume percent when drying carbon black pellets. Hence, other than stoichiometric proportions of fuel gas and air may be utilized and the proportions may be varied to provide a burner bowl temperature as low as 1,000° F. and still maintain some of the benefits of the invention. These advantages may be summarized as follows:

(1) Operation with little or no exces air permits much higher heat input rate, much smaller equipment, and considrably lower residence time, thus reducing particle attrition.

(2) Operation with low excess air reduces the $O_2$ content of the drying gas and thus the product's oxidation hazard.

(3) Construction as herein described leads to a less expensive installation—in addition to size reduction, the need for refractories is greatly reduced, these being used only in the lower section of the dryer, and need not be load-bearing.

(4) The heating efficiency is extremely high due to the high temperature differential between the radiant burner temperature and the outlet gas temperature.

Certain modifications of the invention will become apparent to those skilled in the art and the illustrative details disclosed herein are not to be construed as imposing unnecessary limitations on the invention.

I claim:

1. A fluidized bed dryer comprising in combination (a) an upright cylindrical shell enclosing a single unobstructed drying chamber having means for introducing particulate solids to be dried, means for withdrawing dried solids, and means in its top section for withdrawing gases; (b) a plurality of gas-fired radiant burners in the lower section of said chamber comprising upwardly-facing bowls providing substantial radiant surface for burning fuel gas thereon and means for burning said gas, said burners being the principal heat source within said chamber and combustion gas therefrom venting into said chamber to supply fluidizing gas for solids; and (c) means for supplying fuel and air to said burners.

2. The dryer of claim 1 wherein said burners are uniformly spaced over the bottom of said chamber.

3. The dryer of claim 2 wherein said burners are circular and space between said burners is filled in with refractory material at least to the level of the rim of the burners to exclude solids during drying thereof.

4. The dryer of claim 2 including means for injecting supplemental fluidizing gas intermediate said burners.

5. The dryer of claim 1 including conduit means communicating with the gas withdrawal means of said chamber and with the fuel supply means to said burners for recycling off-gas.

6. A process for drying wet particulate solids which comprises:
(1) fluidizing said solids with a fluidizing gas to maintain a fluidized bed thereof in an enclosed upright drying zone;
(2) burning a combustible fuel-air mixture on a plurality of individual upwardly-facing burner bowls of substantial surface area in the bottom of said zone so as to supply line-of-sight radiant heat at a temperature in the range of about 2000 to 3200° F. and upwardly flowing combustion gas as at least a portion of said fluidizing gas, thereby rapidly and substantially completely drying said solids;
(3) withdrawing fluidizing gas from an upper section of said zone;
(4) introducing wet solids to a section of said bed; and
(5) withdrawing dried solids from another section of said bed.

7. The process of claim 6 including the step of recycling withdrawn fluidizing gas to the lower section of said bed.

8. The process of claim 6 including the step of recycling withdrawn fluidizing gas to said burners.

9. The process of claim 6 wherein substantially a stoichiometric mixture of air and fuel gas is burned in said burners to produce combustion gas of an $O_2$ concentration not more than about 1 volume percent.

10. The process of claim 6 wherein radiant heat is also directed inwardly from radiant burners in the walls forming the periphery of said chamber.

11. The process of claim 6 wherein said solids are carbon black pellets and the $O_2$ concentration in the gases in said zone is not more than about 1 volume percent.

12. A fluidized bed dryer comprising in combination (a) an upright shell enclosing a drying chamber having means for introducing particulate solids to be dried, means for withdrawing dried solids, and means in its top section for withdrawing gases; (b) radiant burners in the upright walls of said shell adjacent the bottom thereof and encircling said chamber forming an enclosing boundary of the drying chamber so that a fluidized bed of particulate material in normal drying position in said chamber is contiguous to said burners and receives direct radiation therefrom, said burners venting into said chamber to supply fluidizing gas for solids; (c) means for supplying fuel and air to said burners; and (d) fluidizing gas injection means in the bottom of said chamber.

13. The dryer of claim 12 including upwardly-facing radiant burners in the bottom of said shell having conduit means connected therewith for supplying a combustible gas.

References Cited by the Examiner

UNITED STATES PATENTS

| 2,215,079 | 9/40 | Hess | 158—116 X |
| 2,343,780 | 3/44 | Lewis | 34—57 |
| 2,520,637 | 8/50 | Henwood | 263—21 |
| 2,529,366 | 11/50 | Bauer | 263—21 |
| 2,729,428 | 1/56 | Milmore | 34—57 |

CHARLES SUKALO, *Primary Examiner.*

JOHN J. CAMBY, *Examiner.*